United States Patent
Tachibana

(10) Patent No.: US 8,133,635 B2
(45) Date of Patent: Mar. 13, 2012

(54) ELECTROLYTE MEMBRANE

(75) Inventor: Toshimitsu Tachibana, Osaka (JP)

(73) Assignee: Nitto Denko Corporation, Osaka (JP)

( * ) Notice: Subject to any disclaimer, the term of this patent is extended or adjusted under 35 U.S.C. 154(b) by 445 days.

(21) Appl. No.: 12/521,361

(22) PCT Filed: Dec. 27, 2007

(86) PCT No.: PCT/JP2007/075188

§ 371 (c)(1),
(2), (4) Date: Jun. 26, 2009

(87) PCT Pub. No.: WO2008/081896

PCT Pub. Date: Jul. 10, 2008

(65) Prior Publication Data

US 2010/0316933 A1 Dec. 16, 2010

(30) Foreign Application Priority Data

Dec. 28, 2006 (JP) .................................. 2006-355480

(51) Int. Cl.
*H01M 8/10* (2006.01)

(52) U.S. Cl. ........ 429/493; 429/465; 429/477; 429/484; 429/491; 429/492

(58) Field of Classification Search .................. 429/465, 429/484, 491, 492, 493
See application file for complete search history.

(56) References Cited

U.S. PATENT DOCUMENTS 5,444,103 A 8/1995 Tabata et al.

FOREIGN PATENT DOCUMENTS

| EP | 1968144 A1 | 9/2008 |
|---|---|---|
| JP | 6-116423 A | 4/1994 |
| JP | 9-102322 A | 4/1997 |
| JP | 2001-23661 A | 1/2001 |
| JP | 2001-348439 A | 12/2001 |
| JP | 2005-267866 A | 9/2005 |
| JP | 2005-353581 A | 12/2005 |
| WO | 2006/068369 A1 | 6/2006 |

OTHER PUBLICATIONS

Communication dated Aug. 24, 2011 from the European Patent Office in counterpart European application No. 07860409.7.
Shin et al. "Sulfonated polystyrene/PTFE composite membranes," Journal of Membrane Science, Elsevier Scientific Publ. Company. Amsterdam, NL, vol. 251, No. 1-2, Apr. 1, 2005, pp. 247-254, XP025391500, ISSN: 0376-7388.
Office Action issued Mar. 8, 2011, in counterpart Chinese Application No. 200780048710.X.
International Search Report for PCT/JP2007/075188, dated Feb. 26, 2008.

*Primary Examiner* — Patrick Ryan
*Assistant Examiner* — Ben Lewis
(74) *Attorney, Agent, or Firm* — Sughrue Mion, PLLC

(57) ABSTRACT

The present invention relates to an electrolyte membrane including a graft polymer having a sulfonic acid group as a proton conductive group, in which, when the electrolyte membrane is divided into four equal parts in a thickness direction thereof, a content of the sulfonic acid group in each of outer regions is larger than a content of the sulfonic acid group in each of inner regions; in which A1, A2, B1 and B2 satisfy the following formula: $1.5 \leq (A1+A2)/(B1+B2) \leq 8$, in which A1 and A2 each represent a maximum value of a distribution amount of the sulfonic acid group in each of the two outer regions, and B1 and B2 each represent an average value of a maximum value and a minimum value of a distribution amount of the sulfonic acid group in each of the two inner regions; and in which the electrolyte membrane has an ion-exchange capacity of 0.5 to 2 meq/g.

5 Claims, 2 Drawing Sheets

ELECTROLYTE MEMBRANE

TECHNICAL FIELD

The present invention relates to an electrolyte membrane including a graft polymer having sulfonic acid group as a proton conductive group, and more particularly relates to an electrolyte membrane different in sulfonic acid group content in a thickness direction.

BACKGROUND ART

A solid polymer electrolyte fuel cell has been expected to be used in wide fields such as a domestic co-generation power source, a power source for mobile instruments, a power source for electric automobiles and a simple auxiliary power source, because of its high energy density. In the solid polymer electrolyte fuel cell, an electrolyte membrane functions as an electrolyte for conducting protons, and simultaneously plays a role of a diaphragm for preventing hydrogen or methanol which is a fuel from being directly mixed with oxygen. Such an electrolyte membrane is required to have high ion-exchange capacity as an electrolyte, to have high proton conductivity, to be electrochemically stable and low in electric resistance because of passing an electric current for a long period of time, to have high mechanical strength as a membrane, and to have low gas permeability to hydrogen gas or methanol which is a fuel and to oxygen gas.

A perfluorosulfonic acid membrane (NAFION, a registered trade mark of DuPont) developed by DuPont, and the like have been generally used as such an electrolyte membrane for a fuel cell. However, in conventional fluorine-containing polymer ion-exchange membranes including NAFION, there have been observed problems that ion-exchange capacity is low, whereas chemical stability is excellent, and further that drying of the ion-exchange membranes occurs, resulting in a decrease in proton conductivity, because of insufficient water retention thereof. When a lot of sulfonic acid groups are introduced into the membrane as a countermeasure thereagainst, membrane strength remarkably decreases due to water retention, resulting in easy breakage of the membrane, which causes a problem of difficult compatibility of proton conductivity and membrane strength. Further, when a lot of sulfonic acid groups are introduced, the rate of change in membrane area also increases with an increase in water content of the membrane. In that case, for example, a direct methanol fuel cell (DMFC) in which an aqueous methanol solution is used as fuel has a problem that an electrolyte membrane which has come into contact with the fuel swells to cause a decrease in adhesion with an electrode. Further, the fluorine-containing polymer electrolyte membrane such as NAFION is very expensive because of complicated synthesis of a fluorine monomer used as a raw material, so that this is a great obstacle to practical realization of the solid polymer fuel cell.

For that reason, development of low-cost high-performance polymer electrolyte membranes has been advanced, in place of the fluorine-containing polymer electrolyte membranes including NAFION. For example, there have been proposed a polymer electrolyte membrane and the like synthesized by introducing a styrene monomer into an ethylene tetrafluoroethylene copolymer (ETFE) membrane by radiation graft reaction, followed by sulfonation (for example, patent document 1).

However, even the above-mentioned electrolyte membrane is not possible to solve the problem of a decrease in adhesion with the electrode.

Patent Document 1: JP-A-9-102322

DISCLOSURE OF THE INVENTION

Accordingly, an object of the invention is to provide an electrolyte membrane having excellent adhesion with an electrode and inducing no decrease in proton conductivity.

The present inventors have found that as a means for keeping excellent proton conductivity in a fuel cell, it is effective to maintain delivery and receipt of a proton at an interface between the electrolyte membrane and the electrode, namely low interface resistance of the electrolyte membrane. Then, the inventors have found that the above-mentioned object can be achieved by inhibiting changes in area of the electrolyte membrane, which are associated with water inclusion, thus arriving at completion of the invention.

Namely, the invention relates to the following (1) to (5):

(1) An electrolyte membrane including a graft polymer having a sulfonic acid group as a proton conductive group, in which, when the electrolyte membrane is divided into four equal parts in a thickness direction thereof, a content of the sulfonic acid group in each of outer regions is larger than a content of the sulfonic acid group in each of inner regions;

in which A1, A2, B1 and B2 satisfy the following formula:

$$1.5 \leq (A1+A2)/(B1+B2) \leq 8$$

in which A1 and A2 each represent a maximum value of a distribution amount of the sulfonic acid group in each of the two outer regions, and B1 and B2 each represent an average value of a maximum value and a minimum value of a distribution amount of the sulfonic acid group in each of the two inner regions; and in which the electrolyte membrane has an ion-exchange capacity of 0.5 to 2 meq/g.

(2) The electrolyte membrane described in (1), in which a main chain of the graft polymer is a fluorine-containing polymer.

(3) The electrolyte membrane described in (2), in which a monomer which binds to the main chain of the graft polymer is styrene.

(4) The electrolyte membrane described in (2), in which the fluorine-containing polymer is polyvinylidene fluoride.

(5) The electrolyte membrane described in (1), in which the value of (A1+A2)/(B1+B2) is within the range of 2 to 5.

In this specification, the terms "outer regions" and "inner regions" as used herein mean the following. Namely, when the electrolyte membrane of the invention is divided into four equal parts in the thickness direction thereof, two outer regions of the four regions obtained by dividing the electrolyte membrane into four equal parts are referred to as the outer regions. Further, similarly, when the electrolyte membrane of the invention is divided into four equal parts in the thickness direction thereof, regions on the inner side of the above-mentioned two outer regions of the four regions obtained by dividing the electrolyte membrane into four equal parts are referred to as the inner regions.

As described above, the electrolyte membrane of the invention has a structure in which the outer regions have a higher sulfonic acid group density than the inner regions. In the case of such a structure, since the sulfonic acid group density in the vicinity of a membrane surface is high, the interface resistance between the membrane and the electrode can be decreased. Further, since the sulfonic acid group density in the inside of the membrane is low, changes in area of the membrane, which are associated with water inclusion, can be inhibited, and adhesion with the electrode can be maintained well.

Further, (A1+A2)/(B1+B2) is hereinafter referred to as an S distribution ratio, and when the S distribution ratio is less than 1.5, it is impossible to satisfy both increased proton conductivity and maintenance of excellent adhesion with the electrode, because the difference in sulfonic acid group density between the outer regions and the inner regions is small. On the other hand, when the S distribution ratio exceeds 8, the sulfonic acid group density in the inner regions becomes too low, resulting in insufficient ion conductivity, or the sulfonic acid group density in the outer regions becomes too high, resulting in increased changes in area of the membrane which are associated with water inclusion (resulting in failure to obtain the effect caused by decreasing the sulfonic acid group density in the inner regions), although it depends on the ion-exchange capacity of the electrolyte membrane. Further, deformations (warps and wrinkles) of the electrolyte membrane occur.

Furthermore, the electrolyte membrane of the invention is required to have an ion-exchange capacity of 0.5 to 2 meq/g. Although it depends on an inner distribution of ion exchange groups, when the ion-exchange capacity is less than 0.5 meq/g, the absolute amount of ion exchange groups becomes too small, resulting in insufficient proton conductivity. On the other hand, when the ion-exchange capacity exceeds 2 meq/g, the absolute amount of ion exchange groups becomes too large, resulting in an increase in changes in area associated with water inclusion.

In addition, in the electrolyte membrane of the invention, a main chain of the above-mentioned graft polymer is preferably a fluorine-containing polymer. With respect to electron beam irradiation at a low accelerating voltage, a lower limit of the accelerating voltage exists in a known electron beam irradiation device due to its performance, and irradiation cannot be performed at an extremely low accelerating voltage in many cases. Use of the fluorine-containing polymer having a high specific gravity more restricts the penetration depth of an electron beam to make it easy to perform treatment in the vicinity of the surface.

BEST MODE FOR CARRYING OUT THE INVENTION

Figure 1:
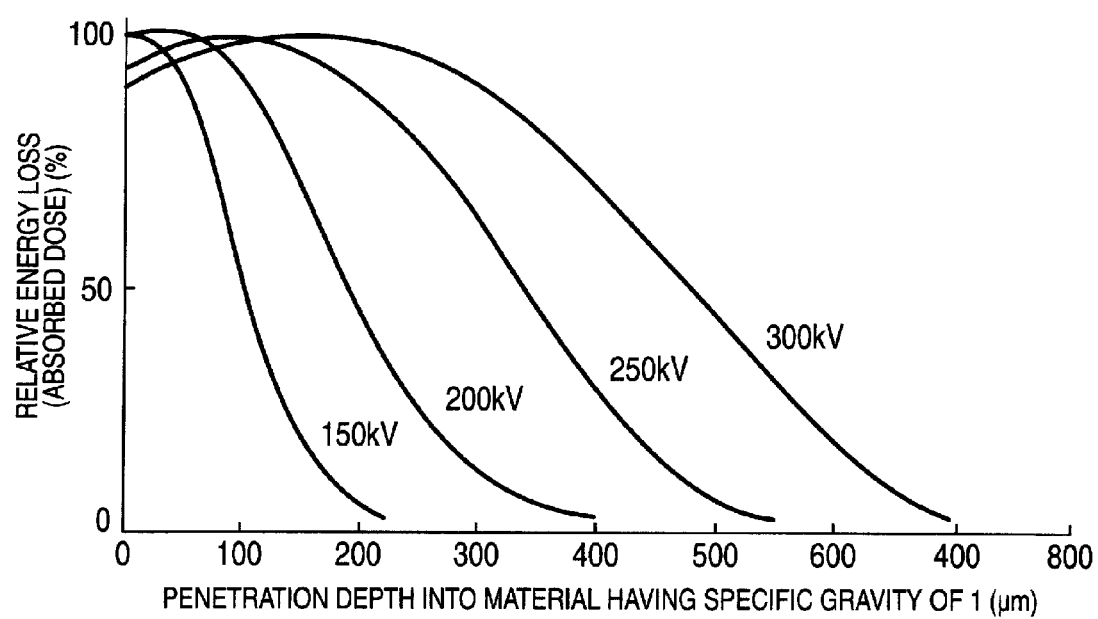
FIG. 1 is depth-dose curves showing the relationship among accelerating voltage values, treatment depths and relative doses showing treatment efficiency.

The electrolyte membrane of the invention includes a graft polymer having sulfonic acid groups as a proton conductive group.

As a polymer which is a material for the membrane, for example, a fluorine-containing polymer, an olefinic polymer or the like may be used. Examples of the fluorine-containing polymers include polytetrafluoroethylene (hereinafter referred to as PTFE for brevity), a tetrafluoroethylene-hexafluoropropylene copolymer (hereinafter referred to as FEP for brevity), a tetrafluoroethylene-hexafluoropropylene-vinylidene fluoride copolymer, a tetrafluoroethylene-perfluoroalkyl vinyl ether copolymer (hereinafter referred to as PFA for brevity), polyvinyl fluoride (hereinafter referred to as PVdF for brevity), an ethylene-tetrafluoroethylene copolymer (hereinafter referred to as ETFE for brevity) and an ethylene-chlorotrifluoroethylene copolymer (hereinafter referred to as ECTFE for brevity). Examples of the olefinic polymers include low-density polyethylene, high-density polyethylene and polypropylene. These may be used alone or in combination thereof. Of these, the fluorine-containing polymer having high durability to electrochemical reaction and the like in a cell is preferably used, and particularly, from the viewpoint of adhesion to an electrode in preparing a membrane/electrode assembly (MEA), PVdF is preferably used.

Further, since the rate of change in dimension associated with liquid retention can be decreased, it is preferred that these polymers are previously crosslinked. For example, as a crosslinking method of PTFE, a method disclosed in JP-A-6-116423 can be employed, and as a crosslinking method of FEP or PFA, a method disclosed in JP-A-2001-348439 can be employed.

It is possible to obtain a graft chain by grafting a monomer by using radiation (such as an electron beam). As such a monomer, one having a vinyl group or one in which a part of hydrogen atoms bonded to a vinyl group is substituted with a different functional group or the like (this is hereinafter referred to as a vinyl monomer) may be used.

These monomers can be used not only alone, but also as a mixture of plural components. Specifically, one represented by the following chemical formula (1) can be used.

$$H_2C=CXR1 \qquad \text{[Chemical Formula 1]}$$

In case where X is H, R1 is —O—$C_nH_{2n+1}$, —C(=O)—$C_nH_{2n+1}$, —C(=O)—O—$CH_{2n+1}$ or —Ar—R2 (Ar is an aryl group), and R2 is H, —$CH_3$, —$CH_2Cl$, —$CH_2OH$, —$C(CH_3)_3$, —$CH_2SO_3Na$, —Br or F.

In case where X is $CH_3$, R1 is —$C_6H_5$ 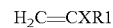

With respect to sulfonation treatment, since an aromatic vinyl monomer is easily treated, the case where R1 in chemical formula (1) is an aryl group is preferred, and the case where the vinyl monomer is styrene is more preferred.

Further, as the vinyl monomer, it is also possible to use a crosslinking agent having a plurality of unsaturated bonds having graft reactivity in a molecule thereof. Specific examples thereof include 1,2-bis(p-vinylphenyl), divinylsulfone, ethylene glycol divinyl ether, diethylene glycol divinyl ether, triethylene glycol divinyl ether, divinylbenzene, cyclohexane dimethanol divinyl ether, phenylacetylene, diphenylacetylene, 2,3-diphenylacetylene, 1,4-diphenyl-1,3-butadiene, diallyl ether, 2,4,6-triallyloxy-1,3,5-triazine, triallyl-1,2,4-benzenetricarboxylate, triallyl-1,3,5-triazine-2,4,6-trione, butadiene, isobutene and ethylene.

Graft polymerization of the above-mentioned monomer to a substrate polymer can be conducted by either a pre-irradiation method of irradiating a substrate film with radiation and then reacting it with the monomer, or a simultaneous irradiation method of simultaneously irradiating the substrate film and the monomer with radiation to polymerize the monomer. The pre-irradiation method in which the amount of a homopolymer formed is small is preferred from the viewpoint of simplicity.

Further, the pre-irradiation method includes two methods: a polymer radical method in which the substrate film is irradiated with radiation in an inert gas; and a peroxide method in which the substrate film is irradiated with radiation under oxygen-present atmosphere. Both of them can be used in the invention.

The substrate film may be a microporous film, but a nonporous film is preferred. The thickness of the substrate film is preferably from 5 to 300 μm, and more preferably from 20 to 150 from the viewpoint of obtaining sufficient proton conductivity while maintaining mechanical strength and the like.

The electrolyte membrane of the invention can be produced, for example, by using an electron beam as the radiation and controlling the accelerating voltage value of the electron beam. By irradiating the substrate film with the electron beam, the polymer constituting the substrate film absorbs its energy, followed by excitation and ionization to form active sites, with which the monomer is allowed to come in contact, thereby starting the graft reaction. More graft chains can be formed in the outer regions than in the inner regions by changing the density of these active sites in the thickness direction of the substrate film, specifically by more increasing the active site density in the outer regions than in the inner regions.

Methods for forming the difference in the density of the active sites include a method of adjusting the accelerating voltage value of electrons at the time of irradiation with the electron beam. The higher the accelerating energy of electrons is, namely, the higher the accelerating voltage value of an electron irradiation device is, the deeper the penetration depth of electrons at the time of irradiation with the electron beam becomes. Namely, when electron beam irradiation is performed to the substrate film having a specific thickness at a sufficiently high accelerating voltage value, the active sites are formed uniformly in the whole film. On the other hand, when electron beam irradiation is performed at a sufficiently low accelerating voltage value, the active sites are formed restrictedly in the vicinity of a surface of the film. Accordingly, the difference in the density of the active sites can be formed in the thickness direction by once irradiating the substrate film with the electron beam at a high accelerating voltage, and then, irradiating the substrate film with the electron beam from both surfaces thereof at a low accelerating voltage. Then, the above-mentioned monomer is allowed to come in contact with the substrate film in this state, thereby being able to form the difference in the density of the graft chains in the thickness direction.

Further, as another method, a substrate film in which graft chains are uniformly distributed overall or a substrate film in which proton conductive groups are uniformly distributed overall is irradiated with an electron beam at a sufficiently low accelerating voltage value in the same manner as described above, and graft polymerization is conducted in a state where active sites are formed only in the vicinity of a surface thereof, thereby being able to form the difference in the density of the graft chains in the thickness direction.

Furthermore, a plurality of electrolyte membranes which are different in ion-exchange capacity are laminated, thereby also being able to form the difference in the density of the proton conductive groups in the thickness direction.

As an index for judging the treatment depth for the accelerating voltage value herein, a depth-dose curve is generally used. The treatment depth of an electron beam is also related to the specific gravity of a material to be irradiated, in addition to the accelerating voltage value. The depth-dose curve shows the relationship among the accelerating voltage value, the treatment depth and the relative dose showing treatment efficiency. For example, the relationship to a material having a specific gravity of 1 is shown in FIG. 1. For example, when a film having a specific gravity of 1 and a thickness of 300 μm is used, the relative dose is a value close to 100 in the depth range of 0 to 300 μm at an accelerating voltage value of 300 kV, which shows that uniform electron beam treatment is performed to the whole film. On the other hand, when electric beam treatment is performed at an accelerating voltage value of 150 kV, the relative dose already reaches approximately 0 at a depth of about 200 μm, which shows that no electric beam treatment is performed in a region deeper than this. As described above, it becomes possible to perform electron beam treatment at any depth by adjusting the accelerating voltage value in view of the gravity of the material.

As one example of the pre-irradiation method, electron beam treatment is performed to the substrate film at a high accelerating voltage in the atmosphere, and then, electron beam treatment is performed on both surfaces of the substrate film at a low accelerating voltage. The substrate film is inserted into a glass container, and thereafter, this container is subjected to vacuum deaeration, followed by replacement to an inert gas atmosphere. Then, a monomer from which oxygen gas has been removed by bubbling of an inert gas containing no oxygen or freeze deaeration, a mixed solution thereof or a monomer solution obtained by dissolving or diluting the monomer with a solvent is filled in the container containing the substrate film irradiated with the electron beam.

The graft polymerization for introducing the graft chains into the substrate polymer is conducted usually at 30 to 150° C., and preferably at 40 to 80° C. The degree of grafting of the polymer largely depends on the molecular weight of the monomer to be polymerized. However, roughly, it is preferably from 6 to 150% by weight, and more preferably from 10 to 100% by weight, based on the substrate polymer before the polymerization. This degree of grafting can be changed by the irradiation dose, the polymerization temperature, the polymerization time and the like.

A known method for introducing ion-exchange groups such as sulfonic acid groups into the graft polymer is disclosed, for example, in JP-A-2001-348439. To give an example, a graft-treated film is immersed in a chlorosulfonic acid solution having a concentration of 0.2 to 0.5 mol/L using 1,2-dichloroethane as a solvent at room temperature to 80° C. for 2 to 48 hours to conduct reaction. After the reaction for a predetermined period of time, the membrane is thoroughly washed. As a sulfonating agent, concentrated sulfuric acid, sulfur trioxide, sodium thiosulfate or the like may be used. It is not particularly limited as long as it can introduce the sulfonic acid groups. Further, ion-exchange groups such as carboxyl groups may be introduced together with the sulfonic acid groups.

When a graft monomer having an ion-exchange group is used, since the ion-exchange group has been introduced into the substrate polymer at the time when the graft polymerization reaction is terminated, it is unnecessary to separately introduce the ion-exchange group. Further, when a graft monomer having a derivative of an ion-exchange group is used, it is necessary to convert the derivative to the ion-exchange group by performing appropriate treatment after the graft polymerization reaction. For example, in the case of an ester group, it is converted to a carboxyl group by conducting hydrolysis.

Although various ion-exchange groups can be introduced into the graft polymer, it is preferred that the sulfonic acid group which is a strong acid group is introduced, because more excellent conductivity is obtained. Incidentally, in the cases of the graft polymer into which the ion-exchange group other than the sulfonic acid group is introduced and the graft polymer having an S element other than the sulfonic acid group, the determination of the ion-exchange group cannot be made. In these cases, distribution of the ion-exchange groups can be confirmed by substituting the ion-exchange groups by metal ions not contained in the electrolyte membrane, and confirming distribution of metal elements thereof.

In the electrolyte membrane of the invention, when the membrane is divided into four equal parts in a thickness direction thereof, the content of the sulfonic acid group in each of outer regions is larger than the content of the sulfonic acid group in each of inner regions.

Further, in the electrolyte membrane of the invention, when A1 and A2 each represent the maximum value of the distribution amount of the sulfonic acid group in each of the outer regions, and B1 and B2 each represent the average value of maximum value and minimum value of the distribution amount of the sulfonic acid group in each of the inner regions, the above-mentioned A1, A2, B1 and B2 satisfy the following equation: $1.5 \leq (A1+A2)/(B1+B2) \leq 8$. The S distribution ratio is preferably from 2 to 5.

Furthermore, in the electrolyte membrane of the invention, the ion-exchange capacity is 0.5 to 2 meq/g, and preferably 0.7 to 1.5 meq/g.

In addition, in the electrolyte membrane of the invention, the rate of change in area due to immersion in pure water at 25° C. is preferably 40% or less, and more preferably 30% or less. When the rate of change in area exceeds 40%, changes in area of the membrane, which are associated with water inclusion, become too large, resulting in failure to maintain well adhesion with the electrode.

Further, in the electrolyte membrane of the invention, the electric conductivity at 25° C. is preferably 0.03 $\Omega^{-1}$ cm$^{-1}$ or more, and more preferably 0.05 $\Omega^{-1}$ cm$^{-1}$ or more. When the electric conductivity is less than 0.03 $\Omega^{-1}$cm$^{-1}$, the electric resistance of the membrane increases, resulting in difficulty to obtain sufficient output.

The electrolyte membrane of the invention has practically sufficient proton conductivity, chemical and thermal stability and mechanical characteristics, and is suitably used as a fuel cell membrane which can be used in solid polymer fuel cells or direct alcohol fuel cells using an alcohol such as methanol. Pure hydrogen, reformed hydrogen gas made from methanol, natural gas, or gasoline, alcohols such as methanol, dimethyl ether and the like can be used as fuels.

EXAMPLES

The invention will be described below with reference to examples and the like specifically showing the constitution and effect of the invention. Incidentally, for evaluation items in the examples and the like, measurements were made as follows:

(a) Degree of Grafting (G)

The degree of grafting was calculated according to the following equation:

$$G=(W2-W1) \times 100/W1$$

in which W1 is the weight (g) of the substrate film before grafting and W2 is the weight (g) of the substrate film after grafting.

(b) Ion-Exchange Capacity (Iex)

The ion-exchange capacity (Iex) of an electrolyte membrane is represented by the following equation. Incidentally, in the measurement of n(acid group)obs, the electrolyte membrane was immersed in a 1 M (1 molarity) sulfuric acid aqueous solution at 50° C. for 4 hours to completely convert it to an acid form. Thereafter, the electrolyte membrane was washed using ion-exchange water and immersed in a 3 M NaCl aqueous solution at 50° C. for 4 hours to convert it to a —SO$_3$Na form. Then, titration was conducted with a 0.05 N sodium hydroxide aqueous solution by using an automatic potentiometric titrator (AT-500N-1, manufactured by Kyoto Electronics Manufacturing Co., Ltd.), and the ion-exchange capacity was calculated.

$$Iex=n(\text{acid group})obs/Wd$$

n(acid group)obs: the molar quantity (mM) of acid groups in the electrolyte membrane Wd: the dry weight (g) of the electrolyte membrane (c) Rate of Change in Area (S)

A sample obtained by cutting the electrolyte membrane into 50 mm×50 mm was allowed to stand in a dryer to be sufficiently dried, and then, the area (S1) thereof was measured. Further, the area (S2) after the sample was immersed in pure water at 25° C. for 24 hours was measured. These values were substituted in the following equation to calculate the rate of change in area (S).

$$S=(S2-S1) \times 100/S1$$

(d) Electric Conductivity (k)

The electric conductivity of the electrolyte membrane was measured by an alternating current method (Shin Jikken Kagaku Koza 19, Polymer Chemistry <II>, page 992, Maruzen). The measurement of the membrane resistance (1m) was made by using an ordinary membrane resistance measurement cell and an LCR meter (E-4925A, manufactured by Hewlett-Packard). The cell was filled with a 1 M sulfuric acid aqueous solution at 25° C., and the resistance between platinum electrodes (distance: 5 mm) was measured by the presence or absence of the membrane. The electric conductivity (specific conductivity) was calculated using the following equation:

$$K=1/Rm \cdot d/S (\Omega^{-1} \text{cm}^{-1})$$

(e) S Distribution Ratio

Figure 2:
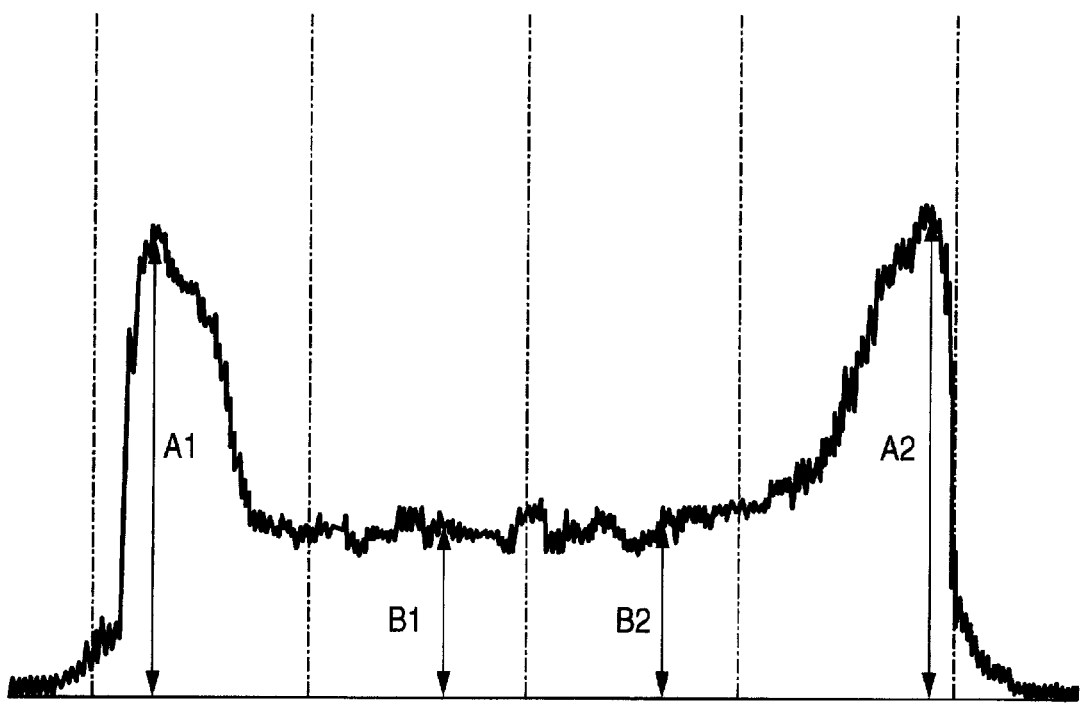
FIG. 2 is analytical data showing the distribution amount of sulfonic acid groups in a cross section of an electrolyte membrane.

The electrolyte membrane (3 mm×8 mm) prepared was embedded in an epoxy resin, followed by curing. The resulting cured body (5 mm×10 mm) was cut with a microtome to expose a cross section. That was fixed to a sample holder and subjected to Pt—Pd vapor deposition to prepare a sample. Using a field emission scanning electron microscope (FE-SEM S-4800, manufactured by Hitachi, Ltd.) and an X-ray microanalyzer (XMA EMAX Energy EX-200, manufactured by Horiba, Ltd.), the distribution amount of sulfonic acid groups in a cross section of the sample was analyzed under the following conditions. The analytical data thereof are shown in FIG. 2. As shown in FIG. 2, the cross section of the sample was divided into four equal parts, A1 and A2 each were taken as the maximum value of the distribution amount of the sulfonic acid group in each of the outer regions, B1 and B2 each were taken as the average value of maximum value and minimum value of the distribution amount of the sulfonic acid group in each of the two inner regions, and the S distribution ratio [(A1+A2)/(B1+B2)] was calculated.

Measurement Conditions

FE-SEM (observed image: secondary electron image, accelerating voltage: 15 kV)

XMA (detector: energy dispersive (EDX) (elemental analysis from 6C to 92U), accelerating voltage: 15 kV)

(f) Output Characteristic (P)

Each of the electrolyte membranes prepared in Examples and Comparative Examples was put between two commercial electrodes (25 cm$^2$, noble metal carrying amount: anode 4 mg/cm$^2$, cathode 2 mg/cm$^2$), and hot pressed at a press pressure of 1.5 MPa at 180° C.×5 min to prepare a sample including the electrode-the electrolyte membrane-the electrode. Using the sample, output characteristic evaluation of DMFC was made under conditions of an operating temperature of 70° C.; a methanol aqueous solution concentration of 2 mol/L and 0.8 ml/min; and stoichiometrically triple the amount of dry air, to measure the maximum output value P (mW/cm$^2$).

Example 1

Graft Polymerization

A PVdF film (thickness: 50 μm, specific gravity: 1.8, a nonporous film) formed by a melt extrusion method was irradiated with an electron beam under a nitrogen atmosphere under conditions of an accelerating voltage value of 250 kV and an irradiation dose of 5 kGy. The film was placed in a glass separable container (inner diameter: 3 cm, height: 20 cm) equipped with a cock, and the container was filled with argon gas of 1 atm. after deaeration. Subsequently, about 100 g of a styrene-toluene mixed solution (a mixed solution of 50% by volume of styrene and 50% by volume of toluene) from which dissolved oxygen was previously removed by argon bubbling was introduced into this container under an argon atmosphere. Here, the film was in a state where it was completely immersed in the mixed solution. After the introduction of the mixed solution, heating was performed at 60° C. for 5 hours to conduct graft polymerization. After the reaction, the film was thoroughly washed with toluene, and dried to obtain a graft membrane. Then, electron beam irradiation was performed on both surfaces of this graft membrane by using an ultra small-scale electron beam irradiation device (Min-EBSTEM-Chamber II, manufactured by Ushio Inc.) under a vacuum atmosphere under conditions of an accelerating voltage value of 25 kV and an irradiation dose of 20 kGy, and thereafter, graft polymerization was conducted again in the same manner as described above.

Sulfonation

This graft-polymerized PVdF film was immersed in a 0.3 M chlorosulfonic acid solution diluted with 1,2-dichloroethane, and heated at 60° C. for 8 hours in a sealed state. Then, the film was washed with water and dried to obtain a sulfonated graft membrane, namely, an electrolyte membrane.

Example 2

Graft Polymerization

A PVdF film (thickness: 50 μm, specific gravity: 1.8, a nonporous film) formed by a melt extrusion method was irradiated with an electron beam under a nitrogen atmosphere under conditions of an accelerating voltage value of 250 kV and an irradiation dose of 5 kGy. Subsequently, electron beam irradiation was performed on both surfaces of the PVdF film by using an ultra small-scale electron beam irradiation device (Min-EBSTEM-Chamber II, manufactured by Ushio Inc.) under a vacuum atmosphere under conditions of an accelerating voltage value of 25 kV and an irradiation dose of 20 kGy. The film was placed in a glass separable container (inner diameter: 3 cm, height: 20 cm) equipped with a cock, and the container was filled with argon gas of 1 atm. after deaeration. Subsequently, about 100 g of a styrene-toluene mixed solution (a mixed solution of 50% by volume of styrene and 50% by volume of toluene) from which dissolved oxygen was previously removed by argon bubbling was introduced into this container under an argon atmosphere. Here, the film was in a state where it was completely immersed in the mixed solution. After the introduction of the mixed solution, heating was performed at 60° C. for 5 hours to conduct graft polymerization. After the reaction, the film was thoroughly washed with toluene, and dried to obtain a graft membrane.

Sulfonation

This graft-polymerized PVdF film was immersed in a 0.3 M chlorosulfonic acid solution diluted with 1,2-dichloroethane, and heated at 60° C. for 8 hours in a sealed state. Then, the film was washed with water and dried to obtain a sulfonated graft membrane, namely, an electrolyte membrane.

Example 3

An electrolyte membrane was obtained in the same manner as in Example 1 with the exception that the conditions of the second electron beam irradiation were changed to "an accelerating voltage value of 25 kV and an irradiation dose of 5 kGy".

Example 4

An electrolyte membrane was obtained in the same manner as in Example 1 with the exception that the conditions of the second electron beam irradiation were changed to "an accelerating voltage value of 25 kV and an irradiation dose of 80 kGy".

Example 5

An electrolyte membrane was obtained in the same manner as in Example 1 with the exception that the conditions of the first graft polymerization were changed to "60° C. for 60 minutes" and that the conditions of the second electron beam irradiation were changed to "an accelerating voltage value of 25 kV and an irradiation dose of 5 kGy".

Example 6

An electrolyte membrane was obtained in the same manner as in Example 1 with the exception that the conditions of the first electron beam irradiation were changed to "an accelerating voltage value of 250 kV and an irradiation dose of 15 kGy" and that the conditions of the second electron beam irradiation were changed to "an accelerating voltage value of 25 kV and an irradiation dose of 80 kGy Comparative Example 1

An electrolyte membrane was obtained in the same manner as in Example 1 with the exception that the conditions of the first electron beam irradiation were changed to "an accelerating voltage value of 250 kV and an irradiation dose of 7 kGy" and that the second electron beam irradiation and graft polymerization were not conducted.

Comparative Example 2

An electrolyte membrane was obtained in the same manner as in Example 1 with the exception that the conditions of the second electron beam irradiation were changed to "an accelerating voltage value of 25 kV and an irradiation dose of 2.5 kGy".

Comparative Example 3

An electrolyte membrane was obtained in the same manner as in Example 1 with the exception that the conditions of the second electron beam irradiation were changed to "an accelerating voltage value of 25 kV and an irradiation dose of 120 kGy".

Comparative Example 4

An electrolyte membrane was obtained in the same manner as in Example 1 with the exception that the conditions of the first graft polymerization were changed to "60° C. for 30 minutes" and that the conditions of the second electron beam irradiation were changed to "an accelerating voltage value of 25 kV and an irradiation dose of 5 kGy".

Comparative Example 5

An electrolyte membrane was obtained in the same manner as in Example 1 with the exception that the conditions of the first electron beam irradiation were changed to "an accelerating voltage value of 250 kV and an irradiation dose of 20 kGy" and that the conditions of the second electron beam irradiation were changed to "an accelerating voltage value of 25 kV and an irradiation dose of 80 kGy".

TABLE 1

|  | Degree of Grafting (wt %) | Ion-Exchange Capacity (meq/g) | Rate of Change in Area (%) | Electric Conductivity ($\Omega^{-1}\text{cm}^{-1}$) | S Distribution Ratio | Maximum Output Value (mW/cm$^2$) |
|---|---|---|---|---|---|---|
| Example 1 | 19 | 1.3 | 16 | 0.08 | 3.0 | 110 |
| Example 2 | 18 | 1.3 | 17 | 0.07 | 2.5 | 100 |
| Example 3 | 15 | 1.1 | 13 | 0.06 | 1.7 | 70 |
| Example 4 | 25 | 1.6 | 26 | 0.11 | 7.5 | 80 |
| Example 5 | 12 | 1.0 | 12 | 0.04 | 2.5 | 60 |
| Example 6 | 35 | 2.0 | 36 | 0.15 | 2.5 | 60 |
| Comparative Example 1 | 12 | 0.9 | 12 | 0.02 | 1.1 | 10 |
| Comparative Example 2 | 12 | 1.0 | 12 | 0.02 | 1.3 | 20 |
| Comparative Example 3 | 31 | 2.0 | 34 | 0.12 | 9.0 | 20 |
| Comparative Example 4 | 5 | 0.4 | 6 | 0.005 | 3.0 | <10 |
| Comparative Example 5 | 44 | 2.2 | 47 | 0.16 | 2.0 | 30 |

According to the electrolyte membranes of Examples 1 to 6, the excellent output characteristic was obtained, compared to Comparative Examples 1 to 5.

While the invention has been described in detail with reference to specific embodiments thereof, it will be apparent to one skilled in the art that various changes and modifications can be made without departing from the spirit and scope.

Incidentally, this application is based on Japanese Patent Application No. 2006-355480 filed on Dec. 28, 2006, the entire contents of which are incorporated herein by reference.

Further, all references cited herein are incorporated by reference in their entirety.

INDUSTRIAL APPLICABILITY

The electrolyte membrane of the invention has the structure in which the outer regions have a higher sulfonic acid group density than the inner regions. In the case of such a structure, since the sulfonic acid group density in the vicinity of a membrane surface is high, the interface resistance between the membrane and the electrode can be decreased. Further, since the sulfonic acid group density in the inside of the membrane is low, changes in area of the membrane, which are associated with water inclusion, can be inhibited, and adhesion with the electrode can be maintained well.

The invention claimed is:

1. An electrolyte membrane comprising a graft polymer having a sulfonic acid group as a proton conductive group, wherein, when the electrolyte membrane is divided into four equal parts in a thickness direction thereof, a content of the sulfonic acid group in each of outer regions is larger than a content of the sulfonic acid group in each of inner regions;

wherein A1, A2, B1 and B2 satisfy the following formula:

$$1.5 \leq (A1+A2)/(B1+B2) \leq 8$$

wherein A1 and A2 each represent a maximum value of a distribution amount of the sulfonic acid group in each of said two outer regions, and B1 and B2 each represent an average value of a maximum value and a minimum value of a distribution amount of the sulfonic acid group in each of said two inner regions; and wherein the electrolyte membrane has an ion-exchange capacity of 0.5 to 2 meq/g.

2. The electrolyte membrane according to claim 1, wherein a main chain of the graft polymer is a fluorine-containing polymer.

3. The electrolyte membrane according to claim 2, wherein a monomer which binds to the main chain of the graft polymer is styrene.

4. The electrolyte membrane according to claim 2, wherein the fluorine-containing polymer is polyvinylidene fluoride.

5. The electrolyte membrane according to claim 1, wherein the value of (A1+A2)/(B1+B2) is within the range of 2 to 5.

* * * * *